US011685752B2

(12) United States Patent
Ermert et al.

(10) Patent No.: US 11,685,752 B2
(45) Date of Patent: Jun. 27, 2023

(54) PROCESS FOR PREPARING ORGANOTIN COMPOUNDS

(71) Applicant: ENTEGRIS, INC., Billerica, MA (US)

(72) Inventors: David M. Ermert, Danbury, CT (US); Thomas H. Baum, New Fairfield, CT (US); Thomas M. Cameron, Newtown, CT (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 17/586,834

(22) Filed: Jan. 28, 2022

(65) Prior Publication Data

US 2022/0242889 A1 Aug. 4, 2022

Related U.S. Application Data

(60) Provisional application No. 63/142,849, filed on Jan. 28, 2021.

(51) Int. Cl.
*C07F 7/22* (2006.01)

(52) U.S. Cl.
CPC .......... *C07F 7/2284* (2013.01); *C07F 7/2296* (2013.01)

(58) Field of Classification Search
CPC .............. C07F 7/2224; C07F 7/2284
See application file for complete search history.

(56) References Cited

U.S. PATENT DOCUMENTS

| | | | | |
|---|---|---|---|---|
| 5,344,948 | A * | 9/1994 | Verkade | C07F 9/005 556/42 |
| 9,310,684 | B2 * | 4/2016 | Meyers | G03F 7/0042 |
| 10,228,618 | B2 * | 3/2019 | Meyers | C23C 16/45561 |
| 11,358,975 | B2 * | 6/2022 | Ermert | C07F 7/2284 |
| 2017/0102612 | A1 * | 4/2017 | Meyers | C23C 14/086 |
| 2019/0315781 | A1 * | 10/2019 | Edson | C07F 7/2224 |
| 2019/0315782 | A1 * | 10/2019 | Edson | C07F 7/2284 |
| 2019/0337969 | A1 * | 11/2019 | Odedra | C23C 16/45536 |
| 2020/0223877 | A1 * | 7/2020 | Odedra | G03F 7/161 |
| 2021/0214379 | A1 * | 7/2021 | Odedra | G03F 7/167 |
| 2021/0347791 | A1 * | 11/2021 | Cardineau | G03F 7/0042 |
| 2021/0397085 | A1 * | 12/2021 | Weidman | G03F 7/0002 |
| 2022/0064192 | A1 * | 3/2022 | Edson | C07F 7/2224 |
| 2022/0242888 | A1 * | 8/2022 | Kuiper | C07F 7/2296 |

FOREIGN PATENT DOCUMENTS

| | | | | |
|---|---|---|---|---|
| GB | 1403673 A | * | 8/1975 | ............. C03C 25/38 |
| TW | 202208388 A | | 3/2022 | |
| WO | WO-2016065120 A1 | * | 4/2016 | ........... G03F 7/0042 |
| WO | 2019023797 A1 | | 2/2019 | |
| WO | 2019217749 A1 | | 11/2019 | |
| WO | WO-2020264557 A1 | * | 12/2020 | ........... G03F 7/0042 |
| WO | WO-2021038523 A1 | * | 3/2021 | ........... C04B 41/009 |

OTHER PUBLICATIONS

IUPAC. Compendium of Chemical Terminology, 2nd ed., pp. 58, 60 and 369 (the "Gold Book") pp. 58, 60, 369 (2012) (Year: 2012).*
H. Reuter et al., 455 Journal of Organometallic Chemistry, 83-87 (1993) (Year: 1993).*
CAS/CAPLUS Abstract of H. Reuter et al., 455 Journal of Organometallic Chemistry, 83-87 (1993) (Year: 1993).*
Hanssgen, D., et al., Synthese der ersten mono-t butylzinnelementverbindungen, Journal of Organometallic Chemistry, 1985, pp. 191-195, vol. 293, Elsevier Sequoia S.A., Lausanne, Netherlands (no English translation available; please see NPL 3, ISR/WO issued in PCT/US2022/014178, for concise explanation of relevance).
Lorberth, Jorg, et al., Spektroskopische untersuchungen an organozinnverbindungen R4-1SnXn, Chemische berichte, Dec. 1964, pp. 3444-3451, vol. 97, Issue 12 (no English translation available; please see NPL 3, ISR/WO issued in PCT/US2022/014178, for concise explanation of relevance).
International Search Report and Written Opinion issued in International Patent Application No. PCT/US2022/014178 dated May 16, 2022, which serves as a concise explanation of the relevance of NPL 1 (Hanssgen, et al.) and NPL 2 Lorberth, et al.) (9 pages).
Beswick, M. A.; Kidd, S. J.; Raithby, P. R.; Wright, D. S. The Synthesis and Structure of [Sn(NMe2)3Li]∞; an Unsolvated Polymeric Tris(Amido)Stannate. Inorganic Chemistry Communications 1999, 2 (9), 419-421 (abstract only).
Schleep et al., "Perfluorinated tert-Butoxides of Tin(II): The Dimeric Alkoxide and Its Monomeric Ate Complex", Z. Anorg. Allg Chem. 2019, 645, 301-308.
Search Report, ROC (Taiwan), Patent Application No. 111103864, 6 pages.

* cited by examiner

*Primary Examiner* — Alexander R Pagano

(57) ABSTRACT

Provided is a facile methodology for preparing certain organotin compounds having alkyl and alkylamino or alkyl and alkoxy substituents. The process provides the organotin compounds in a highly pure form which are particularly useful as precursors in the deposition of high-purity tin oxide films in, for example, extreme ultraviolet light (EUV) lithography techniques used in the manufacture of certain microelectronic devices.

13 Claims, No Drawings

PROCESS FOR PREPARING ORGANOTIN COMPOUNDS

CROSS-REFERENCE TO RELATED APPLICATIONS

This application claims the benefit under 35 USC 119 of U.S. Provisional Patent Application No. 63/142,849 filed Jan. 28, 2021, the disclosure of which is hereby incorporated herein by reference in its entirety.

FIELD OF THE INVENTION

This invention belongs to the field of organotin chemistry. In particular, it relates to a facile process for preparing certain organotin compounds.

BACKGROUND OF THE INVENTION

Certain organotin compounds have been shown to be useful in the deposition of highly pure tin oxide films in applications such as extreme ultraviolet (EUV) lithography techniques used in the manufacture of certain microelectronic devices.

Of particular interest are organotin compounds having a combination of alkylamino groups and alkyl groups. Accordingly, there is a need for improved methodology for manufacturing such organotin compounds in highly pure forms for use in the deposition of highly pure tin oxide films.

SUMMARY OF THE INVENTION

Provided are facile processes for preparing certain organotin compounds having alkyl and alkylamino substituents or alkyl and alkoxy substituents. In one embodiment, the process provides organotin precursor compounds, for example tris(dimethylamido)isopropyl tin (CAS No. 1913978-89-8), in a highly pure form. As such, the products of the process are particularly useful in the deposition of high-purity tin oxide films in, for example, extreme ultraviolet light (EUV) lithography techniques used in microelectronic device manufacturing.

The present invention relates to a process for preparing a compound of Formula (I):

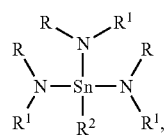

wherein each R is independently chosen from $C_1$-$C_5$ alkyl groups, each $R^1$ is independently chosen from $C_1$-$C_5$ alkyl groups, and $R^2$ is chosen from hydrogen or $C_1$-$C_5$ alkyl groups. The process comprises contacting a compound of Formula (A)

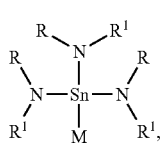

wherein M is chosen from sodium, lithium, or potassium, with a compound of the formula L-$R^2$, wherein L is leaving group.

The present invention further relates to a process for preparing a compound of Formula (I):

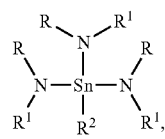

wherein each R is independently chosen from $C_1$-$C_5$ alkyl groups, each $R^1$ is independently chosen from $C_1$-$C_5$ alkyl groups, and $R^2$ is chosen from hydrogen or $C_1$-$C_5$ alkyl groups. The process comprises contacting a compound of Formula (II):

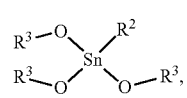

wherein each $R^3$ is independently chosen from straight or branched chain $C_1$-$C_8$ alkyl groups, a phenyl group, and substituted phenyl groups, with a compound of the formula $(R^4)_3Si$—$N(R)(R^1)$.

The present invention further relates to a compound of Formula (II):

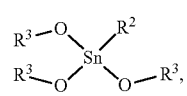

wherein each $R^3$ is independently chosen from straight or branched chain $C_1$-$C_8$ alkyl groups, a phenyl group, and substituted phenyl groups, and $R^2$ is chosen from hydrogen or $C_1$-$C_5$ alkyl groups.

DETAILED DESCRIPTION OF THE INVENTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g., 1 to 5 includes 1, 1.5, 2, 2.75, 3, 3.80, 4 and 5).

In a first aspect, the invention provides a process for preparing a compound of Formula (I):

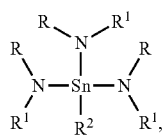
(I)

wherein each R is independently chosen from $C_1$-$C_5$ alkyl groups, each $R^1$ is independently chosen from $C_1$-$C_5$ alkyl groups, and $R^2$ is chosen from hydrogen or $C_1$-$C_5$ alkyl groups. The process comprises combining a compound of Formula (A)

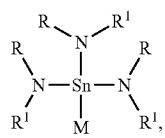
(A)

and a compound of Formula L-$R^2$, wherein L is a leaving group such as a halide or a substituted or unsubstituted aromatic or alkyl sulfonate and M is chosen from sodium, lithium, or potassium. For example, the compound of Formula (A) can be contacted with a compound of Formula L-$R^2$, wherein L is bromo, iodo, or chloro. As a specific example, L is iodo.

In the above process, each R and each $R^1$ can be independently chosen from straight or branched chain alkyl groups including methyl, ethyl, propyl, isopropyl, n-butyl, t-butyl, sec-butyl, n-pentyl, isopentyl, or sec-pentyl groups. In one specific embodiment, each R and each $R^1$ is independently chosen from $C_1$-$C_3$ alkyl group such as a methyl, ethyl, or propyl group. Furthermore, in the above process, $R^2$ is chosen from $C_1$-$C_5$ alkyl groups, which can be substituted or unsubstituted straight or branched chain alkyl group. For example, $R^2$ may be a straight or branched chain alkyl group including methyl, ethyl, propyl, isopropyl, n-butyl, t-butyl, sec-butyl, n-pentyl, isopentyl, or sec-pentyl groups. In addition, $R^2$ can be a cyclic $C_1$-$C_5$ group such as a cyclopropyl group. Also, $R^2$ may be an unsaturated $C_1$-$C_5$ group such as a vinyl group or an acetylenyl group. Any of these $R^2$ groups may be further substituted, such as with one or more halogen groups or ether groups. For example, $R^2$ may be a fluorinated alkyl group having the formula —$(CH_2)_n(CH_aF_b)_m$, wherein m is 1 to 5 and m+n is 1 to 5 and wherein b is 1 to 3 and a+b=3, including a monofluorinated $C_1$-$C_5$ alkyl group, such as a —$CH_2F$ or —$CH_2CH_2F$ group, and a perfluorinated $C_1$-$C_5$ group, such as a —$CF_3$ or $CF_2CF_3$ group. Alternatively, $R^2$ may be an alkylether group, wherein the alkyl portion is a $C_1$-$C_5$ alkyl group. In one specific embodiment, each R and each $R^1$ is methyl and $R^2$ is methyl, ethyl, or isopropyl. Also, M may preferably be lithium. The compound of Formula (A) are useful intermediates in the synthesis of compound of Formula (I).

The compound of Formula (A):

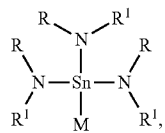
(A)

can be prepared by reacting a dihalostannane, such as $SnCl_2$, with a compound of the Formula (B):

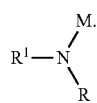
(B)

In this regard, at least about 3 molar equivalents of a compound of Formula (B) is utilized, based on the amount of $SnCl_2$, to form the compound of Formula (A), although additional equivalents may also be used if desired. For example, at least about 3.1 molar equivalents, including at least about 3.25, 3.5, or 3.75 up to about 4 equivalents of the compound of Formula (B) may be used. Examples of compounds of Formula (B) include non-nucleophilic strong bases such as lithium dimethylamide, lithium methylethylamide, lithium diethylamide, and the like. The reaction can be generally conducted at temperatures ranging from about −15° C. to moderately elevated temperatures, such as about 60° C., although other temperatures may also be used depending on, for example, reaction scale or reaction time. For example, the reaction temperature can be between about −30° C. to about 90° C., including from about −10° C. to about 80° C. and about −5° C. to about 70° C. In some embodiments, it may be preferable for the reaction temperature to be above 0° C. Suitable solvents include aprotic solvents including, for example, alkanes such as hexanes and aromatic solvents such as toluene, as well as polar aprotic solvents including, for example, dimethoxyethane and tetrahydrofuran. Other suitable solvents will be known or could be determined by one of ordinary skill in the art. In addition, one or more of the steps of this process can preferably be performed under conditions that minimize exposure of the materials and/or products to light (such as, for example, the use of ambered glassware).

Thus, once the compound of Formula (A) has been formed in situ, it can be reacted with a compound of Formula L-$R^2$, wherein $R^2$ and L are as defined above, to provide the compound of Formula (I). In one embodiment, the compound of Formula (I) has the specific structure:

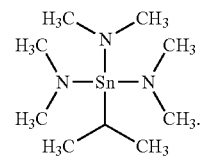

In a second aspect, the invention provides a process for preparing a compound of Formula (I):

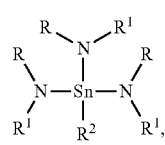
(I)

wherein each R and $R^1$ are as described above. For this aspect, the process comprises combining a compound of Formula (II):

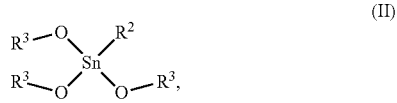

(II)

wherein each $R^3$ is independently chosen from straight or branched chain $C_1$-$C_8$ alkyl groups, a phenyl group, and substituted phenyl groups, and a compound of Formula $(R^4)_3Si-N(R)(R^1)$, wherein $R^4$ is chosen from a $C_1$-$C_3$ alkyl group. For example, the compound of Formula (II) can be contacted with a compound of Formula $(R^4)_3Si-N(R)(R^1)$, wherein $R^4$ is a methyl group. In one embodiment, for the compound of Formula (II), $R^2$ is methyl, ethyl, or isopropyl and each $R^3$ is methyl.

In this aspect, at least about 3 molar equivalents of the compound of Formula $(R^4)_3Si-N(R)(R^1)$ is utilized compared to the compound of Formula (II) in order to form the compound of Formula (I), although additional equivalents may also be used if desired. In one specific example, the compound of Formula $(R^4)_3Si-N(R)(R^1)$ is $(CH_3)_3SiN(CH_3)_2$.

Examples of substituted phenyl groups include phenyl groups substituted one or more times with groups chosen from $C_1$-$C_4$ alkyl, $C_1$-$C_4$ alkoxy, $C_1$-$C_4$ alkylsulfonyl, hydroxy, cyano, nitro, halo, trihalomethyl, phenyl, phenoxy, $C_3$-$C_6$ cycloalkyl, and the like. Specific examples of substituted phenyl groups include 2,6-di-t-butylphen-1-yl, 2,4,6-trimethylphenyl, and the like.

In a further aspect, the invention relates to compounds of Formula (II) as described above, which were surprisingly found to be useful as intermediates in the synthesis of compounds of Formula (I).

The intermediates of Formula (II) can be prepared by reacting a dihalostannane, such as $SnCl_2$, with a molar excess of a compound of Formula $M-OR^3$, wherein M and $R^3$ are as described above, to provide a compound of Formula (C):

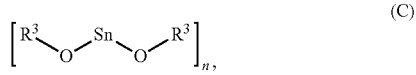

(C)

wherein n is greater than or equal to 1. In turn, this compound can be reacted with a compound of Formula $X-R^2$ to provide the compound of Formula (II).

In the above aspect, n is greater than or equal to 1, depending on the relative size of the $R^3$ group in Formula (C), and in certain cases may be a very large number or an indeterminate number, depending on the level of polymerization of the repeat unit shown above. Thus, as shown, the compound of Formula (C) will tend to form dimers, trimers, oligomers, and even very long linear polymers of indeterminate length. For example, the compound of Formula (C) will have the structure:

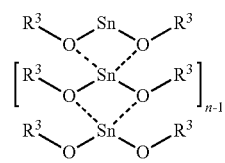

Additionally, the formation of compounds of Formula (C) will invariably result in a mixed population of species, such as dimers, trimers, etc. The intermediate compounds of Formula (C) can be prepared by reacting $SnCl_2$ and a compound of Formula $M-OR^3$, wherein M and $R^3$ are as defined above. A molar excess, for example about 2 molar equivalents of the compound of Formula $M-OR^3$ can be used in some cases although additional equivalents may also be used if desired. For example, at least about 2.1 molar equivalents, including at least about 2.25, 2.5, or 2.75 up to about 3 equivalents of the compound of Formula (B) may be used. As for the first aspect, the reaction can be conducted at temperatures ranging from about −15° C. to moderately elevated temperatures, such as about 60° C., although other temperatures may also be used. For example, the reaction temperature can be between about −30° C. to about 90° C., including from about −10° C. to about 80° C. and about −5° C. to about 70° C. In some embodiments, it may be preferable for the reaction temperature to be above 0° C. Suitable solvents include aprotic solvents including, for example, alkanes such as hexanes and aromatic solvents such as toluene, as well as polar aprotic solvents including, for example, dimethoxyethane, and tetrahydrofuran. Other suitable solvents will be known or could be determined by one of ordinary skill in the art. In addition, one or more of the steps of this process can preferably be performed under conditions that minimize exposure of the materials and/or products to light (such as, for example, the use of ambered glassware).

In another aspect, the invention provides a process in which the compounds of Formula (I) above may be converted to a compound of Formula (II) by means of treatment with an alcohol of the formula $R^3-OH$, such as at room temperature, as shown in the following scheme:

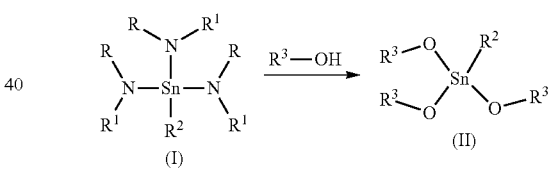

By converting the tin amides of Formula (I) to the tin alkoxides of Formula (II), any impurities that result from the reaction to form the tin amides are also converted. For example, compounds of Formula (I) may include impurities having Formula (Ia):

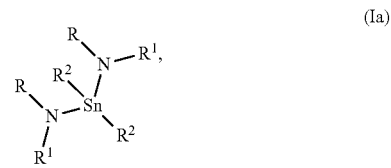

(Ia)

which can be very difficult to separate from the compound of Formula (I), particularly by distillation. These impurities may be much easier to remove from the compound of Formula (II) when the mixture is converted to the corresponding alkoxides, as shown above. Furthermore, when $R^3$ is bulky, such as an isopropyl group, purification by recrystallization may also be possible. Once purified, the compound of Formula (II) may then be reacted with a compound of Formula $(R^4)_3Si—N(R)(R^1)$ as discussed above, thereby reforming the compound of Formula (I) with a significantly reduced amount of the compound of Formula (Ia), such as having greater than 90%, 95%, 97% or 99% of this impurity removed. Thus, this aspect may be a method of purifying a compound of Formula (I).

As noted above, the compounds of Formula (I) so produced are useful as precursors in the deposition of tin oxide films onto the surface of microelectronic devices.

This invention can be further illustrated by the following examples of certain embodiments thereof, although it will be understood that these examples are included merely for purposes of illustration and are not intended to limit the scope of the invention unless otherwise specifically indicated.

EXAMPLES

Example 1

Tin II chloride ($SnCl_2$) (1.0 g, 5.21 mmol) and lithium dimethylamide ($LiN(CH_3)_2$) (0.836 g, 16.4 mmol) were loaded into a 20 mL scintillation vial equipped with a magnetic stir bar and diluted with tetrahydrofuran (THF) (10 mL). The resulting peach-colored mixture was heated at 55° C. for 60 hours. The resulting grey-colored mixture was filtered through a 0.2 μm syringe filter to yield a dark red solution. 2-Iodopropane (0.885 g, 5.21 mmol) was added to the resulting dark red solution and the reaction heated at 60° C. with stirring for one hour, whereby the color changed to a lighter orange, $^1H$- and $^{119}Sn$-NMR on the resulting neat reaction mixture are consistent with formation of $iPrSn(N(CH_3)_2)_3$ ($^{119}Sn$-NMR, −64.18 ppm).

Example 2

(Preparation of $R^2Sn(OR^3)_3$ from $R^2Sn(NR)(NR^1)$)

$iPrSn(N(CH_3)_2)_3$ was placed in a vial (1.0 g, 3.4 mmol) and hexanes (3.5 mL) was added. Methanol (0.40 g, 12.5 mmol) was added at room temperature to the mixture and a reaction occurred immediately as evidenced by effervescence. After 5 minutes the solvent was removed under reduced pressure to yield a white solid (0.76 g, 2.98 mmol, 87.7% yield). $^1H$-NMR (400 MHz, $C_6D_6$, 298K) δ 3.81 (s, 9H); 2.38 (m, 1H); 1.48 (d, 6H) ppm.

Example 3

(Preparation of $R^2Sn(NR)(R^1)$ from $R^2Sn(OR^3)_3$)

$iPrSn(OCH_3)_3$ (2.5 g, 9.8 mmol) was loaded into a 40 ml vial equipped with a stir bar and diluted with 10 mL of toluene. In a separate vial $(CH_3)_3SiN(CH_3)_2$ (3.44 g, 29.4 mmol) was dissolved in 10 mL of toluene. The $(CH_3)_3SiN(CH_3)_2$ solution was added to the $iPrSn(OCH_3)_3$ vial and the resulting white mixture heated at 70° C. with stirring for 12 hours. After 1 hour the reaction presented as a clear solution.

The following morning the reaction presented as a slightly cloudy colorless solution. The reaction was cooled to room temperature and the volatiles removed under reduced pressure to yield a slightly cloudy colorless liquid (Mass: 2.44 g, crude yield: 84.7%).

The collected material was placed in a 50 mL roundbottom flask equipped with a stir bar. A short path distillation head was attached with a thermometer and 10 mL collection flask. The apparatus was placed under dynamic vacuum to a baseline of 800 Torr and the pot heated to 60° C. Upon reaching a pot temperature of 58° C. a colorless liquid was observed in the collection flask (head temp: 38° C.) at a pressure of 800 Torr. When no liquid was observable in the condenser the heating mantle was turned off. Collected 0.96 g, 31.4% yield. $^1H$- and $^{119}Sn$-NMR collected on a neat sample of the product support $iPrSn(N(CH_3)_2)_3$ has been synthesized and is in agreement with the previously collected NMR data.

Example 4

In a reaction vessel, $SnCl_2$ could be reacted with 2 molar equivalents of $Li—OCH_3$. The resulting compound, $[Sn(OCH_3)_2]_n$, could then be isolated and reacted with 2-iodopropane to provide tris(methoxy)isopropyl stannane. The resulting tris(methoxy)isopropyl stannane could in turn be reacted with 3 molar equivalents of $(CH_3)_3Si—N(CH_3)_2$ to provide isopropyl(tris)dimethylamino tin.

Example 5

Synthesis of $MeSn(NMe_2)_3$ $LiSn(NMe_2)_3$ (2.0 g, 7.75 mmol) was placed in a 40 mL vial equipped with a magnetic stir bar and dissolved in tetrahydrofuran (10 mL). In a separate vial, iodomethane (1.31 g, 9.29 mmol) was diluted with THF (2 mL), and the solution was added to the LiSn(NMe2)3 solution with stirring, whereby the reaction became cloudy and warm to the touch. The resulting mixture was stirred at room temperature for 0.2 days. A $^1H$-NMR and $^{119}Sn$-NMR were recorded on a filtered aliquot of the reaction mixture.

$^1H$-NMR (400 MHz, THF, 298K): δ 0.29 (s, 3H); 2.61 (s, 18H) ppm. $^{119}Sn$ {1H}-NMR (149 MHz, THF, 298K): δ −15.04 ppm.

Example 6

$EtSn(NMe_2)_3$ Synthesis $LiSn(NMe_2)_3$ (2.0 g, 7.75 mmol) was placed in a 40 mL vial equipped with a magnetic stir bar and dissolved in tetrahydrofuran (15 mL). In a separate vial, iodoethane (1.44 g, 9.29 mmol) was diluted with THF (2 mL) and the solutions cooled to −35° C. Upon cooling, the iodoethane solution was added to the $LiSn(NMe_2)_3$ solution with stirring, whereby the reaction became warm to the touch. The resulting mixture was stirred at room temperature for 20 minutes, and a $^1H$-NMR and $^{119}Sn$-NMR were recorded on a filtered aliquot of the reaction mixture. $EtSn(NMe_2)_3$ was present by NMR:

$^1H$-NMR (400 MHz, THF, 298K): δ 0.89 (t, 3H); 1.16 (q, 2H); 2.66 (s, 18H) ppm. $^{119}Sn$ {1H}-NMR (149 MHz, THF, 298K): δ −39.13 ppm.

Example 7

$CF_3CH_2Sn(OtBu)_3$ Synthesis $CF_3CH_2Sn(NMe_2)^3$ (2 g, 5.98 mmol) was placed in an amber 40 mL vial equipped with a magnetic stir bar and diluted with hexanes (3 mL). In a separate vial, tBuOH (1.32 g, 17.9 mmol) was dissolved in hexanes (5 mL) and slowly added to the Sn-amide solution dropwise over the course of two minutes with stirring. A slight effervescence was observed throughout the addition. Upon complete addition, the resulting solution was stirred at RT for 10 minutes then dried under reduced pressure to yield a slightly amber solution. $^1H$-, $^{13}C$-, $^{19}F$-, and $^{119}Sn$-NMR recorded on a $C_6D_6$ solution support $CF_3CH_2Sn(OtBu)_3$ formation. Product purity >90% by NMR. $^1H$-NMR (400 MHz, $C_6D_6$, 298K): δ 1.31 (s, 27H); 1.76 (q, 2H) ppm. $^{13}$C-NMR (100 MHz, C$_6$D$_6$, 298K): 28.49 (q), 33.55, 33.69, 74.41 ppm. $^{119}$Sn {1H}-NMR (149 MHz, C$_6$D$_6$, 298K): δ −228.35 (q) ppm. $^{19}$F-NMR (376 MHz, C$_6$D$_6$, 298K): δ −51.95 (t) ppm.

The invention has been described in detail with particular reference to certain embodiments thereof, but it will be understood that variations and modifications can be effected within the spirit and scope of the invention.

What is claimed is:

1. A process for preparing a compound of the Formula (I):

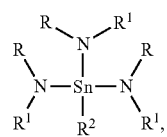
(I)

wherein each R is independently chosen from C$_1$-C$_5$ alkyl groups, each R$^1$ is independently chosen from C$_1$-C$_5$ alkyl groups, and R$^2$ is chosen from a vinyl group or an acetylenyl group, wherein the process comprises:

contacting a compound of the Formula (A)

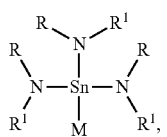
(A)

with a compound of the Formula L-R$^2$, wherein L is leaving group, and M is chosen from sodium, lithium, or potassium.

2. The process of claim 1, wherein L is a halide or a substituted or unsubstituted aromatic or alkyl sulfonate.

3. The process of claim 1, wherein L is bromo, iodo, or chloro.

4. The process of claim 1, wherein each R and each R$^1$ is independently chosen from C$_1$-C$_3$ alkyl group.

5. The process of claim 1, wherein the compound of Formula A is prepared by reaction of a dihalostannane with a compound of the Formula (B):

(B)

6. The process of claim 5, wherein the dihalostannane is SnCl$_2$.

7. A process for preparing a compound of Formula (I):

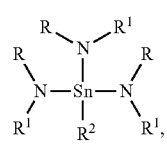
(I)

wherein each R is independently chosen from C$_1$-C$_5$ alkyl groups, each R$^1$ is independently chosen from C$_1$-C$_5$ alkyl groups, and R$^2$ is chosen from hydrogen or C$_1$-C$_5$ alkyl groups, wherein the process comprises:

contacting a compound of Formula (II):

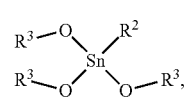
(II)

wherein each R$^3$ is independently chosen from straight or branched chain C$_1$-C$_8$ alkyl groups, a phenyl group, and substituted phenyl groups, with a compound of Formula (R$^4$)$_3$Si—N(R)(R$^1$), wherein R$^4$ is chosen from C$_1$-C$_3$ alkyl groups.

8. The process of claim 7, wherein R$^3$ is a substituted phenyl group selected from phenyl groups substituted one or more times with groups chosen from C$_1$-C$_4$ alkyl, C$_1$-C$_4$ alkoxy, C$_1$-C$_4$ alkylsulfonyl, hydroxy, cyano, nitro, halo, trihalomethyl, phenyl, phenoxy, and C$_3$-C$_6$ cycloalkyl.

9. The process of claim 8, wherein substituted phenyl group is a 2,6-di-t-butylphen-1-yl group or a 2,4,6-trimethylphenyl group.

10. The process of claim 7, wherein the compound of the formula (R$^4$)$_3$Si—N(R)(R$^1$) is (CH$_3$)$_3$Si—N(CH$_3$)$_2$.

11. The process of claim 7, wherein the compound of Formula (II) is prepared by reacting a diahalostannane with a compound of Formula M-OR$^3$, wherein M is chosen from sodium, lithium, or potassium to provide a compound of Formula (C):

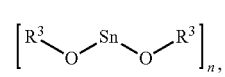
(C)

wherein n is greater than or equal to 1.

12. The process of claim 11, wherein the compound of Formula (C) is further reacted with a compound of Formula X—R$^2$ to provide the compound of Formula (II).

13. A compound of Formula (II):

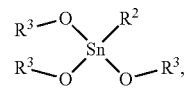
(II)

wherein each R$^3$ is independently chosen from straight or branched chain C$_1$-C$_8$ alkyl groups, a phenyl group, and substituted phenyl groups, and R$^2$ is chosen from hydrogen or C$_1$-C$_5$ alkyl groups wherein R$^3$ is 2,6-di-t-butylphen-1-yl or 2,4,6-trimethylphenyl.

* * * * *